US010312527B2

(12) United States Patent
Madabusi et al.

(10) Patent No.: US 10,312,527 B2
(45) Date of Patent: Jun. 4, 2019

(54) ENERGY STORAGE DEVICE COMPRISING A POLYURETHANE SEPARATOR

(71) Applicant: Chemtura Corporation, Middlebury, CT (US)

(72) Inventors: Venkatramanan K. Madabusi, Naugatuck, CT (US); Kevin Jackson, Norwood, MA (US); George Brereton, Mahopac, NY (US)

(73) Assignee: LANXESS SOLUTIONS US INC., Middlebury, CT (US)

( * ) Notice: Subject to any disclaimer, the term of this patent is extended or adjusted under 35 U.S.C. 154(b) by 247 days.

(21) Appl. No.: 14/880,300

(22) Filed: Oct. 12, 2015

(65) Prior Publication Data

US 2016/0133949 A1    May 12, 2016

Related U.S. Application Data

(60) Provisional application No. 62/077,366, filed on Nov. 10, 2014.

(51) Int. Cl.

| | |
|---|---|
| *H01M 8/18* | (2006.01) |
| *H01M 8/20* | (2006.01) |
| *H01M 8/0239* | (2016.01) |
| *H01M 2/14* | (2006.01) |
| *H01M 2/16* | (2006.01) |
| *H01M 2/20* | (2006.01) |

(52) U.S. Cl.
CPC ......... *H01M 8/0239* (2013.01); *H01M 2/145* (2013.01); *H01M 2/1653* (2013.01); *H01M 2/20* (2013.01); *H01M 8/18* (2013.01); *H01M 8/188* (2013.01); *H01M 8/20* (2013.01); *H01M 2250/20* (2013.01); *H01M 2250/30* (2013.01); *Y02B 90/18* (2013.01); *Y02T 90/32* (2013.01)

(58) Field of Classification Search
CPC .......... H01M 8/18; H01M 8/188; H01M 8/20; H01M 2/1653; H01M 8/0239
See application file for complete search history.

(56) References Cited

U.S. PATENT DOCUMENTS

| | | | |
|---|---|---|---|
| 6,866,965 B2 | 3/2005 | Lee | |
| 8,722,226 B2 | 5/2014 | Chiang et al. | |
| 8,778,552 B2 | 7/2014 | Chiang et al. | |
| 2002/0061449 A1 | 5/2002 | Maruo et al. | |
| 2010/0047671 A1 | 2/2010 | Chiang et al. | |
| 2011/0135988 A1 | 6/2011 | Noumi | |
| 2011/0135989 A1 | 6/2011 | Noumi | |
| 2011/0183567 A1* | 7/2011 | Vedula | D01D 5/0985 |
| | | | 442/328 |
| 2011/0189549 A1* | 8/2011 | Sun | H01M 6/16 |
| | | | 429/338 |
| 2013/0224557 A1 | 8/2013 | Hayakawa et al. | |
| 2014/0091033 A1* | 4/2014 | Kitano | H01M 4/625 |
| | | | 210/505 |
| 2014/0370404 A1* | 12/2014 | Kato | H01M 8/1058 |
| | | | 429/418 |

FOREIGN PATENT DOCUMENTS

| | | |
|---|---|---|
| EP | 2922114 | 9/2015 |
| JP | H5-226002 | 9/1993 |
| JP | 2004031084 | 1/2004 |
| KR | 20140063479 | 5/2014 |
| WO | 0103221 | 1/2001 |
| WO | 2013062990 | 5/2013 |

OTHER PUBLICATIONS

International Search Report for International Application PCT/US2015/055054 conducted under the International Search Authority of the European Patent Office dated Jan. 22, 2016.

* cited by examiner

*Primary Examiner* — Jonathan G Jelsma
(74) *Attorney, Agent, or Firm* — Dilworth IP, LLC

(57) ABSTRACT

Energy storage devices are improved by incorporating polyurethane separators, which separators comprise polyurethane polymers prepared by curing a polycarbonate based polyurethane prepolymer, which polyurethane polymers often further comprise metal or ammonium salts and are often swelled by an organic solvent.

12 Claims, No Drawings

ENERGY STORAGE DEVICE COMPRISING A POLYURETHANE SEPARATOR

This application claims benefit under 35 USC 119(e) of U.S. Provisional Application No. 62/077,366, filed Nov. 10, 2014, the disclosure of which is incorporated herein by reference.

STATEMENT REGARDING FEDERALLY SPONSORED RESEARCH OR DEVELOPMENT

This invention was made with United States government support under Cooperative Research and Development Agreement No: CRD-14-54 awarded by the Department of Energy. The government has certain rights in this invention.

Technological advancements in communications, personal electronic devices, transportation, e.g., battery powered or hybrid vehicles, etc., have increased the demand for improved, high energy, cost effective power sources. Capacitors, fuel cells, rechargeable batteries and the like are well known energy storage devices used everyday as sources of electrical power, frequently as portable electrical power sources, however the demand still exists for lighter, smaller, higher capacity, more durable, more readily charged and longer lasting power sources.

Many uses for these improved power storage/delivery devices are in portable applications. For example, rechargeable batteries and capacitors are used in a host of small devices such as mobile phones, computers, household appliances and power tools, etc. Larger, but still mobile applications for such energy storage devices include automobiles, aircraft, satellites etc. Stationary, large scale applications, or those with limited mobility, are also known. For example, fuel cells, storage batteries and capacitors can be found in power plants. In particular, certain alternate sources of electrical energy, such as the electricity generated from solar or wind, are only operative intermittently, e.g., while the sun shines or the wind blows, and effective use of these energy sources requires storing the energy produce in reliable energy storage devices.

Batteries comprise an electrochemical cell, often a series of electrochemical cells, in which energy is stored by separating an ion source and an ion sink with differing electrochemical potentials, producing a voltage difference between two electrodes, i.e., anode and cathode. When the electrodes are connected by a conductive element an electric current is produced flowing from anode to cathode through the connecting conductive element. In a properly functioning cell or battery, the flow of electrons occurs between the two electrodes outside of the cell or battery, while cations in an electrolyte flow internally between the electrodes to maintain a charge balance. Because a charge imbalance cannot be sustained between the negative electrode and positive electrode, these two flow streams should supply ions and electrons at the same rate.

For example, in the common rechargeable lithium ion secondary battery, as power is drawn from the cell electrons flow from the anode to the cathode, while lithium cations of the electrolyte flow internally to complete the elctrochemical reaction. To avoid a short circuit within the electrochemical cell, the two electrodes are typically separated by a layer or membrane that is electrically insulating but permeable to the flow of the cations. The battery is recharged by applying an opposing voltage difference that drives electronic current and ionic current in an opposite direction as that of a discharging battery in service.

Double-layer capacitors, characterized by high energy density are known. Their relatively high capacity is based on the dissociation of ions in an electrolyte to form a thin dielectric of a few atomic layers at the boundary layer to the electrodes. Aqueous electrolyte solutions can be used as electrolytes. In many of these capacitors however, organic electrolytes are used based on quaternary salts, such as tetraethyl ammonium borofluoride (TEABF), dissolved in acetonitrile or propylene carbonate. The design of double-layer capacitors is similar to that of batteries; the differences primarily relating to mono-polar arrangements, in which the electrodes are wound or stacked.

The amount of time required for recharging a battery is also of growing concern. A lengthy battery recharge could be very inconvenient to one driving an electric car on a relatively long trip. Power sources that can be recharged in alternate ways are known.

Redox flow batteries, also known as a flow cells or redox batteries or reversible fuel cells are energy storage devices in which the positive and negative electrode reactants are typically metal ions in liquid solution that are oxidized or reduced during the operation of the cell. Using two reversible redox couples, liquid state redox reactions are carried out at the positive and negative electrodes. A redox flow cell typically has a power-generating assembly comprising at least an ionically transporting membrane separating the positive and negative electrode reactants (also called catholyte and anolyte), and positive and negative current collectors (also called electrodes) which facilitate the transfer of electrons to the external circuit but do not participate in the redox reaction (i.e., the current collector materials themselves do not undergo Faradaic activity).

Some differences exist in the terminology for components of a flow battery and those of conventional primary or secondary batteries, for example, the electrode-active solutions in a flow battery are typically referred to as "electrolytes", and specifically as the catholyte and anolyte, whereas in secondary battery terminology "electrolyte" refers to the ion transport medium and does not undergo Faradaic activity. Also, the terms "electrode", "anode" and "cathode" are used fairly consistently in the art relating to primary or secondary batteries, however, in the art relating to flow cells, the terms are somewhat differently defined and sometimes used in what appears to be a less consistent manner.

WO 01/03221 discloses a flow cell comprising at least the following components: (a) a redox flow cell comprising (i) an anode in a catholyte chamber, (ii) a cathode in an anolyte chamber, and (iii) an ion-permeable diaphragm between these chambers; (b) two electrolyte containers, one container each for the cathode liquid (here also called positive electrode material, "catholyte-liquid" or "catholyte") and a container for the anode liquid (here also called negative electrode material, "anolyte-liquid" or "anolyte"), and (c) a pumping system, which ensures the circulation of the cathode liquid and the anode liquid from the containers to the flow cell and back to the containers. The cathode-liquid and the anode-liquid are pumped through the chambers of the flow cell, i.e. the catholyte chamber and the anolyte chamber, which are separated by an ion-conductive diaphragm or membrane.

One can recharge a flow battery by reversing the flow of electrolytes while applying an opposing voltage difference similar to a lithium secondary battery, or one can replace the spent catholyte and anolyte with fresh materials, by refilling or changing out the catholyte and anolyte containers. The recovered or spent electrolyte material can be regenerated at another time if desired or by alternate means if desired.

While early redox flow batteries using solutions of electrolytes have many attractive features, they may be limited by their energy density, being in large part determined by the solubility of the metal ion redox couples in liquid solvents, which may be relatively low. The extent to which metal ion solubilities may be increased is limited.

US 2010/0047671 discloses that instead of solutions of electrolytes, dispersions of electrolytes, such as particles or emulsions, can act as anolytes and/or catholytes in respective flow chambers. U.S. Pat. Nos. 8,722,226 and 8,778,552 disclose anolytes and catholytes that are in the form of slurries, semi-solids, and condensed liquids of electrolytic material. The amount of anolyte and catholyte contained within a given volume can therefore be increased, creating higher energy density, and providing the battery with a greater charge.

In flow cells, as in conventional batteries, an electrically insulating but cation permeable layer, i.e., a separator, is located between the anodic region and the cathodic region. The separator must be resistant to mechanical, chemical and electrical stresses and prevent the contact of anodic materials with cathodic materials while allowing for rapid ion transport. For example, separators, also referred to herein as membranes, must not exhibit heat shrinkage or other deformation and must avoid excessive swelling when contacted with solvents while maintaining a high rate of ion transport.

Solid electrolyes, gel electrolyes, porous films, ion permeable membranes, ion exchange materials, polymeric laminates have all been used as separators in rechargeable lithium batteries. Polymer layers and films, such as polyurethane films, have found use as separators in lithium batteries, especially in lithium batteries comprising an organic electrolyte, e.g., a lithium salt dissolved in an organic solvent.

JP Patent Pub. No. 2004-31084 discloses a separator for non-aqueous batteries comprising a polymer resin coating layer having fine pores on one surface of its base material. The separator has some ability to swell with liquid electrolyte and prevents internal shorting following detachment and movement of electrode active materials.

JP Patent Pub. No. H5-226002 discloses a gel electrolyte for lithium secondary batteries comprising an ether-based polyurethane, LiPF6, and propylene carbonate. The gel electrolyte is said to swell with a liquid electrolyte and provide a lithium secondary battery with an excellent interfacial impedance by improving contact between the electrodes and the electrolyte.

US Patent Appl. Pub. 2013/0224557 discloses a separator for non-aqueous batteries comprising a base layer comprising a fiber aggregate ensure the strength of the separator, and a layer of a particular electrolyte-swellable urethane resin to reduce the resistance of the separator due to the urethane resin's ability to swell with liquid electrolyte. The urethane resin is obtained by reacting a polyol containing a vinyl polymer and a polyether polyol with a polyisocyanate.

WO 2013062990 discloses a membrane useful as a separator in a rechargeable lithium battery comprising a thermoplastic poly(dialkylene ester) derived polyurethane composition capable of swelling with adsorbed liquid electrolyte. Also disclosed is the incorporation of fillers, including lithium salts, into the polyurethane resin.

U.S. Pat. No. 6,866,969 discloses a method for preparing a cross-linked polyether polymeric electrolyte by crosslinking a mixture comprising an isocyanate terminated pre-polymer having a polyethylene oxide backbone, with a glycerol ethoxylate and/or glycerol propoxylate cross-linking agent, an organic solvent and a lithium salt, which electrolyte can serve as a separator in a lithium ion battery.

United States Patent Application 2002/0061449 discloses an ion-conductive composition, suitable for use as a gel electrolyte separator for a lithium battery, comprising a thermoplastic polyurethane resin prepared by reacting a polyol compound with a polyisocyanate compound and a chain extender.

Many current flow cells are aqueous, i.e., the electrolytes used therein are typically dissolved, suspended, or mixed with water, and the cation that flows internally to balance the charge between the anodic and cathodic regions upon electrical discharge is often hydrogen.

The most commonly encountered separators found in flow cells are based on ion exchange membranes such as those comprising NAFION or AMBERLYST. NAFION, a perfluorosulfonic acid membrane that binds cations, and NAFION modified with e.g., $SiO_2$, $TiO_2$, ZrP, sulfonated polymers, etc., are the most prevalent, however, the use of organic polymers, such as microporous polyolefin films, are known.

U.S. Pat. No. 8,722,226 discloses the use of polyethylene oxide polymer in ionically transporting separator membranes. For example, an electrolyte comprising a polyethyleneoxide (PEO) polymer in which a lithium salt is complexed to provide lithium conductivity, can be used as the separator membrane, which is pinhole-free and a solid ionic conductor, optionally stabilized with other membranes such as glass fiber separators as supporting layers.

It is well understood in the art that there is a need for improved separator membranes, for use in flow cells and other energy storage devices such as rechargeable secondary cells and capacitors. Improvements in ion selectivity, permeability and conductivity are needed as are greater mechanical stability and lower costs. Particular polymeric compositions have now been identified which have excellent properties for use as ion transport membranes in energy storage devices, for example, as ion permeable separators for non-aqueous flow cells.

SUMMARY OF THE INVENTION

A separator for an energy storage device is provided, the separator comprising an ion-permeable, i.e., ion transporting, film or membrane comprising one or more polycarbonate based polyurethane resins in which a metal or ammonate salt, e.g., a metal salt such as a lithium or sodium salt, is often embedded, and which separator, in many embodiments, is swelled by an organic solvent. The separator of the invention can be used in almost any energy storage device including rechargeable batteries, capacitors, redox flow cells, fuel cells etc.

The separator of the invention is placed between the anode region and the cathode region of an energy storage device and allows ion transport between the two regions while preventing, or at least inhibiting, the transport of electric current, anode active redox materials and cathode active redox materials between the two regions.

For example, one broad embodiment of the invention provides an ion-permeable or ion transporting separator comprising a polycarbonate based polyurethane polymer, i.e., a polyurethane polymer prepared by crosslinking a mixture comprising an isocyanate terminated pre-polymer having a polycarbonate backbone. In one embodiment, the separator comprises a polycarbonate based polyurethane polymer, a metal or ammonium salt, and/or an organic solvent.

Another broad embodiment provides an energy storage device, e.g., primary battery, secondary battery, capacitor, redox flow cell, fuel cell and the like, comprising the separator of the invention.

In one particular embodiment, the energy storage device of the invention comprises:
A) an anode region comprising an anolyte, an anode chamber, and a current collector, which current collector resides within the anode chamber;
B) a cathode region comprising a catholyte, a cathode chamber, and a current collector, which current collector resides within the cathode chamber; and
C) an ionically transporting separator disposed between the anode chamber and the cathode chamber, wherein the separator comprises a polyurethane prepared by crosslinking a mixture comprising an isocyanate terminated pre-polymer having a polycarbonate backbone.

DESCRIPTION OF THE INVENTION

An improved energy storage device, e.g., primary battery, secondary battery, capacitor, fuel cell, redox flow cell etc., is obtained by incorporating therein a separator comprising a polycarbonate based polyurethane. The separators of the invention will selectively allow transport of ions, typically cations of the working or support electrolyte, from one region of the device to another region as needed in order to balance the flow of electrons during charging or discharging of the device.

Elastomeric or thermoplastic polycarbonate based polyurethane resins may be used in the preparation of the inventive separators. In many embodiments the separator is non-porous, meaning that it has a continuous surface without pores or holes. Typically, a salt, e.g., a metal salt such as a lithium or sodium salt, is embedded within the polycarbonate based polyurethane. In many embodiments the separator also comprises a solvent, e.g., an organic solvent, which solvent is used to swell the polycarbonate based polyurethane resin. For example, when a polycarbonate based polyurethane film of the inventive separator is contacted with certain organic solvents the film absorbs solvent and swells. Such swelling is known to increase the rate of ion transport in similar systems.

The polycarbonate polyurethane separators of the invention swell when contacted with certain organic solvents, but they do so without the over swelling that inhibits the use of some polymers. The solvents are those typically found as part of liquid or gel electrolytes commonly used in current energy storage devices. The separators are easily processed, but have excellent mechanical and dimensional strength for resisting shrinking or deformation.

Polycarbonate based polyurethanes useful in the separators of the invention are prepared by curing a mixture comprising an isocyanate terminated pre-polymer having a polycarbonate backbone, which prepolymer is prepared from a mixture comprising an isocyanate monomer and a polycarbonate polyol, or a mixture of polyols wherein at least one polyol is a polycarbonate polyol. The polycarbonate based polyurethane may be prepared from more than one prepolymer, for example, the polycarbonate based polyurethane resin may be prepared by crosslinking a mixture comprising an isocyanate terminated prepolymer having a polycarbonate backbone and an isocyanate terminated pre-polymer having a polyether or polyester backbone.

Many isocyanate monomers and polycarbonate polyols are known in the art, including, for example, polycarbonate polyols prepared from the reaction of alkyl or aryl carbonates with alkane diols or triols, aryl diols or triols, polyether polyols, polyester polyols and the like.

In some embodiments, the polycarbonate based polyurethane prepolymer is prepared from a mixture comprising more than one isocyanate monomer and/or more than one polyol. For example, the polyol may comprise a mixture of polycarbonate polyols, or a mixture comprising one or more polycarbonate polyol with other polyols such as polyol ether polyols, e.g., polyethylene glycol (PEG), polypropylene glycol (PPG), poly tetramethylene glycol (PTMG), polyester polyols, alkyl polyols caprolactone polyols, etc. Typically at least 50, 60, 70, 80, 90, 95 wt % or more, based on the total weight of all polyols in the mixture, is one or more polycarbonate polyols.

A wide variety of polyisocyanate monomers are well known in the art and any that provide a polycarbonate based polyurethane resin with the desired properties can be employed. Typically, di-isocyanates make up the majority of the polyisocyanate monomers used as large quantities of tri- and tetra-isocyanates etc., can provide undue crosslinking. Aliphatic diisocyanates or aromatic diisocyanates, and mixtures of isocyanate monomers may be used. Common aliphatic diisocyanates include 1,6-hexane diisocyanate (HDI), isophorone diisocyanate (IPDI), and methylene bis(p-cyclohexyl isocyanate) ($H_{12}$MDI), dibenzyl-4,4'-diisocyanate, isophorone diisocyanate (IPDI), 1,3 and 1,4-xylene diisocyanates, 1,3-cyclohexyl diisocyanate, and 1,4-cyclohexyl diisocyanate (CHDI). Common aromatic diisocyanates include diphenylmethane diisocyanate (MDI), polymeric MDI, toluene diisocyanate (TDI), naphthalene diisocyanate (NDI), 3,3'-bitoluene diisocyanate (TODD, diphenyl 4,4'-diisocyanate (DPDI), tetramethylxylylene diisocyanate (TMXDI), para-phenylene diisocyanate (PPDI), stilbene-4,4'-diisocyanate, and benzophenone-4,4'-diisocyanate.

In certain embodiments, the diisocyanate monomers are selected from PPDI, MDI, TDI, HDI and $H_{12}$MDI, e.g., PPDI, TDI and MDI.

Curing agents, also called coupling agents or cross linking agents, are well known in the art and any that provide a polycarbonate based polyurethane resin with the desired properties can be employed. In many embodiments the curing agent comprises, for example, a diol, triol, tetrol, diamine or diamine derivative. More than one curing agent may be used.

In some embodiments the curing agent comprises a diol or other polyol, for example, diols useful in the invention include $C_{2-12}$ diols such as ethylene glycol, diethylene glycol, propylene glycol, dipropylene glycol, 1,4-butanediol, 1,6-hexanediol, 1,3-butanediol, 1,5-pentanediol, cyclohexanedimethanol (CHDM), neopentylglycol, di(hydroxymethyl)benzene, hydroquinone, hydroquinone bis (hydroxylethyl ether) also known as 1,4-di(2-hydroxyethoxy)benzene or HQEE, resorcinol, bis(beta-hydroxyethyl)ether also known as 1,3-di(2-hydroxyethyl) benzene; catechol, bis(beta-hydroxyethyl)ether also known as 1,2-di(2-hydroxyethoxy)benzene and the like. The curing agent may also comprise polyether polyols such as PTMG, polyester polyols, polycaprolactone polyols or polycarbonate polyols.

A mixture of two or more glycols may be used as the curing agent. In certain particular some embodiments, the chain extender comprises one or more of HQEE, 1,4-butanediol, 1,6-hexanediol and cyclohexanedimethanol, e.g., a mixture of HQEE and 1,4-butanediol; a mixture of 1,4-butanediol and cyclohexanedimethanol; a mixture of HQEE, 1,4-butanediol and cyclohexanedimethanol; and the like.

In some embodiments the curing agent comprises a diamine or other polyamine or derivative thereof, for example, diamine or diamine derivatives using in the present invention include methylene dianiline, methylene bis chloroaniline, ethylene bis orthochloroaniline, 4,4'-methylene-bis(3-chloro-2,6-diethyl)aniline, dimethylthio-2,4-toluenediamine, di-p-aminobenzoate, phenyldiethanol amine mixture, methylene dianiline sodium chloride complex and the like. Mixtures comprising more than one diamine or diamine derivatives may be used. Also, mixtures comprising amine base curing agents and polyol curing agents may be used.

In some embodiments of the invention, polyurethane polymer is prepared by a process that comprises curing a low free isocyanate prepolymer, i.e., less than 1% by weight of free isocyanate monomer, with a curing agent to form the polyurethane polymer. In some embodiments the prepolymer is very low in free polyisocyanate content, e.g., less than 1% by weight, often less than 0.5% and frequently less than 0.1% by weight.

The polyols, polyisocyanates, and curing agents above are all known materials.

In some embodiments the separator comprises other polymers in addition to the polycarbonate based polyurethane resin as part of a polymer blend. In some embodiments the separator of the invention comprises a polymer blend comprising a polycarbonate based polyurethane resin and, for example, other polyurethane resins such as polyether based polyurethanes, polyester based polyurethanes, polycaprolactone based polyurethanes etc.; polyethers; polyacrylates; polyesters; polyolefins; polyamides; polystyrenes; polynitriles such polyacrylonitrile and nitrile rubbers; epoxy resins; polyvinylidenedifluorides; polyacetals, polyvinylchlorides; polycarbonates; polyphenylene sulfides and the like including copolymers and blends thereof. The use of such polymers as part of a battery separator are well known and specific examples can be found in the previously cited background art. In most embodiments wherein the separator comprises a blend comprising a polycarbonate based polyurethane and other polymers, at least 50, 60, 70, 80, 90, 95 wt % or more, based on the total weight of the polymers in the polymer blend is one or more polycarbonate based polyurethane resin.

In other embodiments the separator of the invention comprises polymers in addition to the polycarbonate based polyurethane as part of a separate component, e.g., the separator may comprise components such as a support layer, a supporting mesh, a frame, embedded particles etc., that comprise, in part or in total, polymers other than a polycarbonate based polyurethane.

In many embodiments the separator comprises a salt, often embedded in a polycarbonate based polyurethane resin or blend. When present, the salt of the separator of the invention may comprise the same cation as that which is transported through the separator, for example, in device in which a lithium cation is transported between the anode region and cathode region the separator may comprise a lithium salt. In some cases, the transport properties of a particular cation are enhanced through inclusion of other cationic species in the separator, for example, a source of ions such as Na+, K+, Cs+, may be incorporated into the separator to increase Li+ transport.

In many embodiments, the salt is a lithium salt such as those typically used as a component in an electrolyte composition found in an elctrochemical cell or battery, such as lithium halides, lithium borates, lithium aluminates, lithium aluminosilicates, lithium-containing zeolites, micas, lithium carbides, $Li_3N$, lithium oxides, lithium mixed oxides, lithium phosphates, lithium carbonate, lithium silicates, lithium sulfides, lithium sulfates. For example, common electrolyte salts known for providing good lithium ion conductivity and useful in the present separator include lithium hexafluorophosphate ($LiPF_6$), lithium tetrafluoroborate ($LiBF_4$), lithium perchlorate ($LiClO_4$), LiSCN, lithium tetrachloroaluminate ($LiAlCl_4$), lithium bromide (LiBr), lithium hexafluoroarsenate ($LiAsF_6$), $LiCF_3SO_3$, $LiCF_3CO_2$, $LiSbF_6$, lithium lower fatty acid carboxylates, LiCl, LiI, lithium bis(trifluoromethanesulfonyl)imide $Li(CF_3SO_2)_2N$, $Li(C_2F_5SO_2)_2N$, $Li(CF_3SO_3)_2N$, $LiC_4F_9SO_3$, $Li(CF_3SO_2)_3C$, chloroborane lithium, $LiBPh_4$, and $Li(CF3_5O_2)(CF_3CO)N$. For example, in certain embodiments the one or more lithium salt comprises a salt selected from $LiPF_6$, $LiBF_4$, $LiClO_4$, $LiAlCl_4$, LiBr, $LiAsF_6$ and $Li(CF_3SO_3)_2N$.

A salt can be incorporated into the separator of the invention, typically in the polycarbonate based polyurethane resin, in a variety of ways. For example, the salt may already be incorporated into the polycarbonate based prepolymer, the salt may be incorporated into the polycarbonate based polyurethane resin during cure, or the salt may be incorporated after the formation of the polyurethane resin.

In one embodiment a salt is dissolved or suspended in a polyol that is then reacted with an isocyanate monomer to prepare a polyurethane prepolymer. Conversely, the salt can be mixed with the isocyanate monomer before reaction. An organic solvent may be used to assist in the dissolution or suspension of the salt.

In another embodiment a salt is present in the mixture comprising a polyurethane prepolymer and curing agent prior to cure. The salt may be first dissolved or suspended in the prepolymer or curing agent prior to mixing, or added to the prepolymer/curing agent mixture before curing occurs. An organic solvent may be used to assist in the dissolution or suspension of the salt. In one embodiment a solvent is used to dissolve the prepolymer or isocyanate monomer and the salt is suspended in the solution.

In other embodiments a salt is incorporated into an already cured a thermoplastic or elastomeric polyurethane resin contacting the polyurethane with a solution of the salt in a solvent, which solvent swells the polyurethane. The salt is thus incorporated into the swelled polymer. The swelled polymer can be used in the separator as is, or the solvent can be removed, e.g., by evaporation, leaving a dried polyurethane polymer comprising an imbibed salt. Alternatively, a polyurethane resin can be dissolved in a solvent along with a dissolved or suspended salt, to generate, after solvent removal, a polyurethane polymer comprising an embedded salt.

Solvents useful for dissolving or suspending salts useful in the present invention, or for dissolving, suspending or otherwise diluting the polyols, isocyanate monomers, prepolymers, curing agents and polyurethane resins useful in the present invention, are well known in the art and are readily optimized by the practitioner.

In other embodiments, a thermoplastic or elastomeric polyurethane is heated to become soft or molten, and the salt is compounded into the softened or molten polyurethane. In one particular embodiment a salt is incorporated into a thermoplastic polyurethane by extrusion, however, any common heat processing method may be used.

The polycarbonate based polyurethane composition of the present invention may also include solids other than those salts described above. For example, inorganic oxides, compound oxides, silicates, sulfates, carbonates, phosphates, nitrides, amides, imides and carbides of the elements of the 1st, 2nd, 3rd or 4th main group or the 4th subgroup of the periodic table. Examples include calcium oxide, silica, alumina, magnesium oxide titanium dioxide; mixed oxides of silicon, calcium, aluminum, magnesium and titanium; silicates such as talc; calcium carbonate, magnesium carbonate, barium carbonate, lithium carbonate, potassium carbonate, sodium carbonate; sulfates of alkali metals and alkaline-earth metals; polymer particles of e.g., polyethylene, polypropylene, polystyrene, polytetrafluoroethylene, polyvinylidene fluoride; polyamides, polyimides; ceramics, and surface-treated fillers.

Typically, the solids have a primary particle size of from 5 nm to 25 microns, e.g., from 0.01 to 10 microns e.g., from 0.01 to 5 microns, or 0.01 to 1 microns, as determined by electron microscopy. The solids may be symmetrical in their external shape, i.e., have a dimensional ratio of height:width:length (aspect ratio) of about 1 and be shaped as spheres or pellets, be approximately round in shape, or else be in the shape of any desired polyhedron, such as cuboid, tetrahedron, hexahedron, octahedron or bipyramid; or they may be distorted or asymmetric, i.e., have a dimensional ratio height:width:length (aspect ratio) which is not equal to 1 and be, for example, in the form of needles, asymmetrical tetrahedra, asymmetrical bipyramids, asymmetrical hexa- or octahedra, lamellae or plates, or have fiber-like shape. If the solids are asymmetric particles, the upper limit given above for the primary particle size refers to the smallest axis in each case. The solids may also be fibers or nanofibers.

The polymer compositions of the present invention may also include conventional additives, used in conventional amounts, for example, plasticizers, lubricants, processing aids, antioxidants, other anti-degradants, other stabilizers, acid scavengers, and other additives as desired. Antioxidants include, e.g., phenolic and phosphite antioxidants. Lubricants include, e.g., metal stearates, paraffin oils and amide waxes. Each of these optional additional additives described above may be present in, or excluded from, the polyurethane compositions of the invention. These additives may be present in the polymer compositions of the present invention from 0 or 0.01 to 5 weight percent of the composition. These ranges may apply separately to each additional additive present in the composition or to the total of all additional additives present.

As ion transport is often more efficient through polymeric substrates when swelled with an appropriate solvent, the separators of the invention typically comprises an organic solvent that swells the polymer, in many embodiments the separator comprises the polycarbonate based polyurethane resin, the solvent and a salt, i.e., a salt as described above. The solvent, as well as the salt, are sometimes incorporated into the separator after the polymeric component of the separator is installed during the manufacture of the energy storage device. In many embodiments, the solvents, and/or salts, are those found in, for example, known rechargeable lithium batteries, such as those known as useful in the preparation of an electrolyte solution or gel electrolyte, in particular non-aqueous or organic electrolytes, used in a lithium battery. Specific examples can be found in the cited background art and include esters, ethers, amides, sulfalones, ketones, sulfoxides and the like, well known examples include cyclic carbonic acid esters, acyclic carbonic acid esters, cyclic carboxylic acid esters etc.

A sampling of the solvents proposed as components of Li-ion battery electrolytes useful in the present separators include:

cyclic carbonate esters such as ethylene carbonate, propylene carbonate, butylene carbonate and the like;

acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate, butylpropyl carbonate, and the like;

other esters such as butyrolactone, ethyl acetate, methyl propionate, ethyl propionate, etc.;

acetals, ethers and polyglymes such as dimethoxyethane, diethoxyethane, tetrahydrofuran, 2-methyl tetrahydrofuran, 1,3-dioxolane, 4-methyl-1,3-dioxolane, dialkyl ethers, diethyleneglycol dimethylether, diethyleneglycol diethylether, and triethyleneglycol diethylether (tetraglyme) etc.;

fluorobenzenes such as 2-fluorobenzene, 3-fluorobenzene, 4-fluorobenzene;

sulfoxides and sulfalones such as dimethylsulfoxide, sulfolane, methylsulfolane etc.;

amides and nitriles such as dimethylformamide, dimethyl acetamide, N-methyl-2-pyrrolidone, acetonitrile, propiononitrile and the like.

For example, ethylene carbonate, propylene carbonate, butylene carbonate, dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate, butylpropyl carbonate, butyrolactone, 1,3-dioxolane, 4-methyl-1,3-dioxolane, diethyleneglycol diethylether, and triethyleneglycol diethylether dimethylsulfoxide, dimethylformamide, dimethyl acetamide, N-methyl-2-pyrrolidone, acetonitrile.

There are many options for manufacturing the separator of the invention. They can be manufactured using casting techniques commonly used in forming elastomeric polyurethane articles from mixtures of prepolymers and curing agents; they can be formed from casting techniques commonly used in forming elastomeric or thermoplastic polyurethane articles from existing elastomeric or thermoplastic polyurethane resins; they can be prepared using extrusion or other thermal processes common in forming thermoplastic articles from existing polymers; or a combination of casting and thermal processing methods can be used. Also, as known in, for example, the production of lithium batteries, a separator may be formed during the production of the cell or battery.

As is common in the art, various embodiments of the invention include a separator of the invention in the form of a simple polymer film, a gel electrolyte, a polymer matrix comprising a solvent, a polymer matrix comprising a solution of an electrolyte salt in an organic solvent, a layered or laminated object wherein one of the layers comprises the polyurethane of the invention, a polymer matrix comprising the polyurethane of the invention supported on a mesh, etc.

The separator of the invention comprises at least a polycarbonate based polyurethane. Typically, the polycarbonate based polyurethane is, or is part of a film or thin section, typically from 0.1 to 750 microns thick, e.g., 50 to 500, 50 to 100, 10 to 50, 100 to 300 or 100 to 250 microns thick, which in many embodiments further comprises a salt, e.g., a metal salt such as a metal salt commonly found in battery electrolytes. Often, the film or thin section comprises the polycarbonate based polyurethane along with other polymers. The polycarbonate based polyurethane resin is prepared using known methods from a mixture comprising an appropriate prepolymer and curing agent. As ion transport is often more efficient through polymeric substrates when swelled with an appropriate solvent, the separators of the invention typically comprises an organic solvent that swells the polymer. The solvent can be introduced to separator at any point during production of the separator or energy storage device, for example, the polymeric substrate of the separator may be already part of the energy storage device when it is swelled with solvent. The ammonium or metal salt typically found in the separator can likewise be incorporated at any point during production of the separator or energy storage device.

In one embodiment, a separator of the invention comprising a polycarbonate based polyurethane is formed directly, i.e., concurrent with the formation of the polycarbonate based polyurethane, by casting a mixture comprising an isocyanate capped polycarbonate based prepolymer and curing agent, and any optional components, into a mold and curing the mixture. In one embodiment, the mixture comprising the polycarbonate based prepolymer and curing agent also comprises a salt, such as a lithium salt, so that a separator further comprising said salt is directly formed.

In a particular embodiment, a polyurethane prepolymer is prepared from an isocyanate monomer and a polyol into which a salt is dissolved or suspended to prepare a prepolymer embedded with the salt. The prepolymer is then conveniently used as part of the mixture that is cast into a mold and cured to directly form a separator of the invention comprising a polycarbonate based polyurethane and a salt. An organic solvent may be used in solvating or suspending the salt. The polyol into which the salt is dissolved or suspended may be a polycarbonate based polyol that in incorporated into a polycarbonate based prepolymer, or it may be any other polyol, such as a polyether or polyester polyol as described above.

In another embodiment, a separator of the invention comprising a polycarbonate based polyurethane and a salt is formed by casting a mixture comprising an isocyanate capped polycarbonate based prepolymer and curing agent, and any optional components, into a mold curing the mixture, and then soaking the cured material in a solution or suspension comprising an organic solvent and the desired salt. In certain embodiments the solvent is then removed, and in some embodiments for handling purposes etc., but either the same solvent or a different solvent is incorporated into the separator at a later stage in the making of the energy storage device.

In other embodiments a polycarbonate based polyurethane resin is prepared in a first step or otherwise obtained, and then subsequently processed to form the separator. For example, in a simpler permutation of the above processes, a mixture comprising a polycarbonate based prepolymer and curing agent can be prepared and cast to form a thin section of polycarbonate based polyurethane resin which is then cut into an appropriate size and shape. In one embodiment a salt is present in a prepolymer or in the prepolymer/curing agent mixture. In another embodiment a salt is introduced into the cured polymer by contact with a solution or suspension comprising an organic solvent and the desired salt either before or after the cured polymer is formed into the appropriate size and shape for a separator.

Other embodiments for manufacturing the separators of the invention make use of other well known methods for preparing films. For example, a polycarbonate based polyurethane resin, with or without and embedded salt, can be dissolved or dispersed in a solvent along with any other desired components, including other polymer resins, ammonium or metal salts, plasticizers, processing aids, other additives etc., to provide a mixture which is then applied to a support by, for example, casting, spraying, pouring, drawn down, dipping, spin coating, roller coating, printing etc., and then dried or cured. The film thus obtained can be used as is or further processed to incorporate other components, such as a metal salt and/or solvent, or to form the appropriate size and shape. Solvents and other conditions used in this procedure are well known in the art and readily optimized by the practitioner.

Other embodiments for the manufacture of the separators make use of melt processing or other thermal processing techniques to mix, blend or compound the components of the separator and/or form the separator. For example, films or other thin sections comprising the polycarbonate based polyurethane resin of the invention and other desired components can be formed by injection molding, compression molding, kneading, extrusion, calendaring and the like can be used to prepare the separator itself, or to prepared a compounded polymer composition capable of being further processes into the separator. As above, an ammonium or metal salt can be incorporated prior to the thermal processing or in a subsequent step, any solvent used to swell the separator will be incorporated after thermal processing.

The separator of the invention can be a single polymeric layer or it may comprise multiple layers. In the present context, a single polymeric layer may comprise a single polymeric resin, such as a polycarbonate based polyurethane resin, or a layer may comprise a blend of more than one polymer which blend is formed into a single layer or multiple layers. It should also be apparent that a polymeric layer will typically comprise other components of the separator. e.g., a metal salt, a solvent etc. There is no specific limitation of the thickness of the layer. Many examples of separators are found in the art and in many embodiments the thickness of the separator layer of the invention is similar to those in the art. One feature of the present separators is that they can swell by absorbing solvents, however, the change in dimensions upon swelling are not enough to interfere with the production or use of the energy storage device.

In some embodiments, a multi-layered separator of the invention is an article wherein a layer comprising the polycarbonate based polyurethane is laminated on a support, such as a chemically inert porous support, or sandwiched between multiple support layers. A support may also be, e.g., a mesh, upon which the layer comprising the polycarbonate based polyurethane is laminated, or the mesh may be engulfed by the polycarbonate based polyurethane layer of the invention. Any of the above methods can be used to laminate the layer comprising the polycarbonate based polyurethane onto a support, or in some embodiments a binder is used to keep the layers together. As above, a salt, such as an electrolyte salt as described above, and/or a solvent may be introduced into the separator at any point.

The separator of the invention is typically flexible, especially in single polymer layer embodiments. The separator may also be flexible in multi-layer embodiments, provided that the other layer(s) are also flexible, however, in some embodiments a support layer is rigid, making the separator less flexible.

One broad embodiment of the invention is the energy storage device comprising the inventive separator. The separator of the invention is well suited for non-aqueous devices and will typically be used in devices that employ organic solvents rather than water as a solvent or mobile phase. The separator is situated between the anodic and cathodic regions of the energy storage device, but any device architecture meeting this limitation is possible. Typically the separator defines a boundary of the anodic and cathodic regions. In a particular embodiment, the separator of the invention is laminated onto, or otherwise attached to, one or more electrode or current collector of an energy storage device.

The energy storage device comprising the separator may be any such device having an anode or anodic region and a cathode or cathodic region. For example, the energy storage device may comprise a stationary anode and a stationary cathode as found in a primary or secondary lithium battery, or the energy storage device may comprise an anode region comprising an electron collector and a flowable anolyte and a cathode region comprising an electron collector and a flowable catholyte as found in a flow cell. The device may also comprise one of a stationary anode or cathode and one of an anode region comprising an electron collector and flowable anolyte or a cathode region comprising an electron collector and flowable catholyte.

In one particular embodiment the energy storage device comprises at least one of an anode region comprising an electron collector and flowable anolyte, or a cathode region comprising an electron collector and flowable catholyte. In a specific embodiment, the energy storage device is a redox flow cell comprising a separator of the invention situated between an anode region comprising an electron collector and flowable anolyte and a cathode region comprising an electron collector and flowable catholyte. Some of characteristics of particular energy storage devices of the invention are described below.

The following terms, as used herein, are defined as follows:

"Current collector" is an electrode facilitating the transfer of electrons from an anolyte to an external circuit during discharge or facilitating the transfer of electrons to a catholyte from an external circuit during discharge, but does not participate in the redox reaction i.e., the current collector materials themselves do not undergo Faradaic activity. The opposite flow of electrons obviously occurs during charge.

"Anolyte" refers to the chemical entity that during electric discharge of the energy storage device reacts to release electrons. "Catholyte" refers to the chemical entity that during electric discharge of the energy storage device reacts to accept electrons. As used herein, the anolyte or catholyte comprises the specific chemical entity that releases or accepts electrons as well as any solvent or other component present to dissolve, support or otherwise impact the ability of the chemical entity to interact with the current collector. During recharge of a spent energy storage device by applying an opposing voltage difference, the direction of electron flow is reversed, so that the anolyte receives electrons and the catholyte releases electrons.

"Anode chamber" is the space in which the anolyte contacts a current collector to release electrons during discharge mode. "Cathode chamber" is the space in which the catholyte contacts the current collector to accept electrons during discharge mode. Generally, an ion conducting separator, such as that of the invention, defines a boundary of both the anode chamber and the cathode chamber.

"Anode region" is the portion of an energy storage device that comprises elements associated with electron release, such as a stationary anode in a primary or secondary lithium battery; in a device such as a flow cell the anode region comprises the anode chamber, current collector, any anolyte that is present, and any vessel that may store anolyte prior to entry to the anode chamber or after leaving the anode chamber.

"Cathode region" is the portion of an energy storage device that comprises elements associated with electron acceptance, such as a stationary cathode in a primary or secondary lithium battery; in a device such as a flow cell the cathode region comprises the cathode chamber, current collector, any catholyte that is present, and any vessel that may store catholyte prior to entry to the anode chamber or after leaving the anode chamber.

One embodiment of the invention provides an energy storage device comprising:
A) an anode chamber and a current collector, which current collector resides within the anode chamber; and/or
B) a cathode chamber and a current collector, which current collector resides within the cathode chamber;
wherein an ion transporting separator C) is disposed between the anode chamber and the cathode chamber; wherein the separator comprises a polyurethane prepared by crosslinking a mixture comprising an isocyanate terminated pre-polymer having a polycarbonate backbone.

In particular embodiments, the energy storage device of the invention is a flow cell comprising:
A) an anode region comprising an anode chamber and a current collector, which current collector resides within the anode chamber;
B) a cathode region comprising a cathode chamber and a current collector, which current collector resides within the cathode chamber; and
C) an ion transporting separator disposed between the anode chamber and the cathode chamber; wherein the separator comprises a polyurethane prepared by crosslinking a mixture comprising an isocyanate terminated pre-polymer having a polycarbonate backbone.

Obviously, during operation of, e.g., a flow cell, the device will also include an anolyte, a catholyte and any vessel associated with their storage or the capture of spent material. For example:

An Energy Storage Device Comprising:
A) an anode region comprising an anode chamber, a current collector, which current collector resides within the anode chamber and an anolyte; and/or
B) a cathode region comprising a cathode chamber, a current collector, which current collector resides within the cathode chamber, and a catholyte;
wherein an ion transporting separator C) is disposed between the anode chamber and the cathode chamber; wherein the separator comprises a polyurethane prepared by crosslinking a mixture comprising an isocyanate terminated pre-polymer having a polycarbonate backbone, For Example, an Energy Storage Device Comprising:
A) an anode region comprising an anode chamber, a current collector, which current collector resides within the anode chamber and an anolyte;
B) a cathode region comprising a cathode chamber a current collector, which current collector resides within the cathode chamber and a catholyte; and
C) an ion transporting separator disposed between the anode chamber and the cathode chamber; wherein the separator comprises a polyurethane prepared by crosslinking a mixture comprising an isocyanate terminated pre-polymer having a polycarbonate backbone, or Any of the above described devices further comprising a vessel for storing anolyte or catholyte and/or a vessel for receiving spent anolyte or catholyte.

In many of these particular embodiments, the separator comprises a polycarbonate based polyurethane resin, an electrolyte salt, such as a metal salt, e.g., a lithium or sodium salt, which electrolyte salt may be embedded within the polycarbonate based polyurethane resin, and an organic solvent, which solvent typically swells the polycarbonate based polyurethane resin composition.

The separator of the invention provides advantages over other known separators. For example, the separator of the invention is flexible and can be used in non-aqueous devices whereas NAFION, commonly employed in many aqueous flow cells, is rigid and does not function well in non-aqueous systems. The present separator also swells to a lesser extent than many other separators based on organic materials or polymers, for example, polyethylene oxide based separators.

The current collector (electrode) of, e.g., a flow cell, is electronically conductive and should be electrochemically inactive under the operation conditions of the cell and can be in the form of a sheet, mesh, fiber, felt, or in any configuration for which the current collector is distributed in the anolyte or catholyte and permits fluid flow. Selection of current collector materials is well-known to those skilled in the art.

A redox flow cell operates using a flowable anolyte and/or catholyte. Flowable anolytes and catholytes include, e.g., a solution or suspension of redox active electrolyes capable of participating in the desired redox reaction, a dispersion or suspension of electrolyes capable of participating in the desired redox reaction, or a flowable liquid electrolyte which is itself an electrolyte capable of participating in the desired redox reaction, which flowable liquid electrolyte may be diluted with an appropriate carrier. In select embodiments any solvent or carrier employed in an anolyte or catholyte is a non-aqueous solvent. Examples of flowable electrolytes, and components thereof, are known in the art and any that are compatible with the inventive separator may be used.

During operation of the flow cell, the anolyte and/or catholyte flow by the current collector, or flow through the current collector, depending of the shape, porosity etc., of the current collector electrode. In some embodiments the anolyte and/or catholyte comprise electroactive redox species dissolved in solution, but in other embodiments, flowable semi-solid, suspension, or condensed liquid redox compositions are employed. In many embodiments a pump or other device is used to propel the anolyte or catholyte through the anode or cathode chamber.

Any material useful in a non-aqueous energy storage device, e.g., working electrolyte salts, redox active materials, electrode materials, solvents, dispersants, other additives etc., can generally be used in the energy storage device of the invention. For example, many redox active materials useful in the present anolyte and catholyte are known and include organic, inorganic and organo-metal species. In some embodiments, the anolyte and catholyte comprise a redox pair of organic molecules, in some embodiments the redox pair comprises inorganic salts, or metal salts having organic counter ions.

In one particular embodiment of the invention, the separator is used in a non-aqueous, organic flow cell, or flow battery, which uses the redox chemistry of organic molecules rather than metal compounds. Organic flow batteries have very fast charge times and relatively high energy density, i.e., the amount of energy stored in a given system per unit volume or mass. When using only organic compounds as the redox couple in a system that further contains an organic solvent, the separator must be stable in organic solvents, e.g., propylene carbonate (PC), or acetonitrile, under conditions of use, allow the working ion to migrate, and act as a barrier preventing migration of the organic compounds of the redox couple from anode region to cathode region and vice versa. Preventing transport of organic redox materials through the membrane can be problematic for a polymeric separator in that some swelling of the polymer increases working ion, i.e., lithium cation, transport, but too much swelling often leads to unacceptable transport of the organic redox compounds.

It has been found that the polycarbonate based polyurethane separators of the invention absorb enough organic solvent, e.g., propylene carbonate or acetonitrile, to allow for good lithium uptake and transport that provides desirable conductivity, generally >10-3 Siemens/cm is desired. Selecting the correct polycarbonate based polyurethane, or blend of the polyurethane with other polymers, allows for good ion transport and conductivity while substantially limiting transport of organic redox materials such as, e.g., 2,2,6,6,-tetramethylpiperidyl-N-oxide and tetramethylphenylene diamine.

Certain embodiments employ an anolyte and/or catholyte wherein the electrochemically active, material is an ion storage material, i.e., flowable ion-storing redox compositions comprising both redox active materials and working ions. Typical working ions in nonaqueous systems include $Li^+$, $Na^+$, or other alkali ions, and on occasion, $Ca^{2+}$, $Mg^{2+}$, or $Al^{3+}$, but others may be used. Generally, a negative electrode ion storage material and a positive electrode ion storage material are required, the negative electrode storing the working ion of interest at a lower absolute electrical potential than the positive electrode. Systems employing both negative and positive ion-storage materials are advantageous because there are no additional electrochemical byproducts in the cell.

In some embodiments at least one of the anolyte or catholyte includes a condensed ion-storing liquid of a redox-active compound, which may be organic or inorganic, and includes but is not limited to lithium metal, sodium metal, lithium metal alloys vanadium metal and vanadium compounds, gallium and indium alloys with or without dissolved lithium, molten transition metal chlorides, thionyl chloride, and the like, or redox polymers and organics that are liquid under the operating conditions of the battery. Such a liquid form may also be diluted by or mixed with another, non-redox-active liquid that is a diluent or solvent, including mixing with such a diluents to form a lower-melting liquid phase.

Particular embodiments include non-aqueous flow cell systems employing both negative and positive lithium ion storage materials. In some embodiments, flowable semi-solid or condensed liquid ion-storing redox compositions include materials proven to work in conventional, solid lithium-ion batteries. In some embodiments, the positive flowable electroactive materials contain lithium positive electroactive materials and the lithium cations are shuttled between the negative electrode and positive electrode, intercalating into solid host particles suspended in a liquid electrolyte.

In some embodiments, the redox-active material comprises an organic redox compound that stores the working ion, e.g., "p"-doped conductive polymers such as polyaniline or polyacetylene based materials, polynitroxide or organic radical entities, carbonyl based organics, and oxocarbons and carboxylate, including compounds such as $Li_2C_6O_6$, $Li_2C_8H_4O_4 2C$, and $Li_2C_6H_4O_4$, and organosulfur compounds.

Electronically insulating organic redox compounds may be used, e.g., liquid or flowable polymers that are electronically insulating. In such cases, the redox active slurry may or may not contain an additional carrier liquid. Additives can be combined with the condensed phase liquid redox compound to increase electronic conductivity. In some embodiments, such electronically insulating organic redox compounds are rendered electrochemically active by mixing or blending with particulates of an electronically conductive material, such as solid inorganic conductive materials including but not limited to metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments.

Electronically insulating organic redox compounds may also be rendered electronically active by mixing or blending with an electronically conductive polymer, including but not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocene-substituted polyethylene, carbazole-substituted polyethylene, polyoxyphenazine, polyacenes, or poly(heteroacenes. The conductive additives form an electrically conducting framework within the insulating liquid redox compounds that significantly increases the electrically conductivity of the composition. In some embodiments, the conductive addition forms a percolative pathway to the current collector.

In some embodiments the redox-active material comprises a sol or gel, including for example metal oxide sols or gels produced by the hydrolysis of metal alkoxides, amongst other methods generally known as "sol-gel processing." Vanadium oxide gels of composition VxOy are amongst such redox-active sol-gel materials.

Other suitable positive active materials include solid compounds known to those skilled in the art as those used in NiMH (Nickel-Metal Hydride) Nickel Cadmium (NiCd) batteries. Still other positive electroactive compounds for Li storage include those used in carbon monofluoride batteries, generally referred to as CFx, or metal fluoride compounds having approximate stoichiometry $MF_2$ or $MF_3$ where M comprises Fe, Bi, Ni, Co, Ti, V. Another example, fullerenic carbon including single-wall carbon nanotubes (SWNTs), multiwall carbon nanotubes (MWNTs), or metal or metalloid nanowires may be used as ion-storage materials.

Exemplary electroactive materials for the catholyte in a lithium system include the general family of ordered rock salt compounds $LiMO_2$, wherein M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, Li(Ni, Co, Al)$O_2$ and Li(Ni, Mn, Co)$O_2$. Other families of exemplary electroactive materials includes those of spinel structure, such as $LiMn_2O_4$ and its derivatives, $LiMPO_4$ and derivatives, in which M comprises one or more of Mn, Fe, Co, or Ni, partially fluorinated compounds such as $LiVPO_4F$, transition metal polyanions, and vanadium oxides including $V_2O_5$ and $V_6O_{11}$.

In some embodiments the redox-active material comprises a metal salt that stores an alkali ion by undergoing a displacement or conversion reaction. Examples of such compounds include metal oxides such as CoO, $Co_3O_4$, NiO, CuO, MnO, which upon reaction with Li undergo a displacement or conversion reaction to form a mixture of $Li_2O$ and the metal constituent in the form of a more reduced oxide or the metallic form. Other examples include metal fluorides such as $CuF_2$, $FeF_2$, $FeF_3$, $BiF_3$, $CoF_2$, and $NiF_2$, which undergo a displacement or conversion reaction to form LiF and the reduced metal constituent. In other embodiments the redox-active electrode material comprises carbon monofluoride or its derivatives.

Exemplary electroactive materials for the anolyte in a lithium flow cell include graphite, graphitic boron-carbon alloys, hard or disordered carbon, lithium titanate spinel, or a solid metal or metal alloy or metalloid or metalloid alloy that reacts with lithium to form intermetallic compounds, including but not limited to Sn, Bi, Zn, Ag, and Al, and the metalloids Si and Ge.

Typical current collectors for lithium redox flow cells include copper, aluminum, or titanium for the negative current collector and aluminum for the positive current collector. Metal alloys and coated metals are also used. Current collector materials can be selected to be stable at the operating potentials of the positive and negative electrodes of the flow battery. In nonaqueous lithium systems the positive current collector may comprise aluminum, or aluminum coated with conductive material that does not electrochemically dissolve at operating potentials of 2.5-5V with respect to Li/Li+. Such materials include Pt, Au, Ni, conductive metal oxides such as vanadium oxide, and carbon. The negative current collector may comprise copper or other metals that do not form alloys or intermetallic compounds with lithium, carbon, and coatings comprising such materials on another conductor.

Carrier liquids useful in the anolyte or catholyte can be any liquid that can dissolve, suspend and transport the solid or condensed ion-storing liquid of the flowable redox composition, notably cyclic carbonate esters and their chlorinated or fluorinated derivatives, acyclic dialkyl carbonate esters, butyrolactone, tetrahydrofuran, 2-methyl tetrahydrofuran, 1,3-dioxolane, 4-methyl-1,3-dioxolane, sulfolane, methylsulfolane, acetonitrile, propiononitrile, tetraglyme, and the like.

The separators of the invention, in particular the separators comprising metal salts, e.g., lithium salts, embedded in a polycarbonate based polyurethane resin, show good lithium ion transport, conductivity, dimensional strength, and barrier properties relative to redox material transport when compared with other types of polymeric separators, especially in non-aqueous flow cells.

EXAMPLES

In the following Examples, polyurethane polymers were prepared from prepolymers and curing agents using variations of known processes and a sampling of different methods for incorporating lithium salts into the polyurethane component are shown. Performance characteristics of the resulting polymer compositions were evaluated using standard test methods modified when necessary to address specific issues raised by the physical and handling properties of the individual separator compositions.

Example 1—Li Doped Polycarbonate Based Polyurethane Film from Low Free Monomer Polycarbonate/PPDI Prepolymer and Butane Diol To 0.25 g of PC/PPDI prepolymer ADIPRENE LFP 3940A was added a solution of 0.0375 grams of bis(trifluoromethane)sulfonimide lithium salt (LiTFSI) in 1 mL of propylene glycol monomethane ether acetate (PMAc). The mixture was stirred and heated by a 100 C oil bath for approximately 10 minutes to completely dissolve the prepolymer, after which 0.0095 g of 1,4-butanediol (BD) was added, the resulting mixture was stir at 100 C for 2 minutes, degassed under vacuum for 3 minutes and then poured onto a TEFLON coated silica wafer heated on a 110 C hotplate. The cast film on the silica wafer was dried on the hotplate for an additional 10 minutes to allow most of the remaining solvent to evaporate and then placed in an oven at 110 C to post cure for 16 hours to provide a 150-200 micron polyurethane film containing 15 wt % of lithium salt.

Example 1a

Following the procedure of Example 1, but using only 67% of the amount of LiTFSI, provided a 150-200 micron polyurethane film containing 10 wt % of lithium salt.

Example 1C—Polycarbonate Based Polyurethane Film from Low Free Monomer PC/PPDI Prepolymer and Butane Diol Containing No LiTFSI Following the procedure of Example 1, but without adding any LiTFSI, provided a 150-200 micron polyurethane film containing no lithium salt.

Example 1CS—Li Salts Imbibed into PC/PPDI Polyurethane Film

The film obtained in Ex 10 is soaked in a 1.0M LiTFSI propylene carbonate (PC), ethylene carbonate (EC), or acetonitrile (AcN) solution for a specific time at a selected temperature, removed and patted dry.

Example 1SPC—LiTFSI Salts Imbibed into PC/PPDI Polyurethane Film, Propylene Carbonate (PC)

Samples of the film obtained in Ex 10 are soaked in a 1.0M LiTFSI/PC solution at room temperature. Samples are removed at intervals, e.g., 4 hours, 24 hours, 3 days, 5 days, and patted dry.

Example 1SAcN—LiTFSI Salts Imbibed into PC/PPDI Polyurethane Film, Acetonitrile (AcN)

Samples of the film obtained in Ex 10 are soaked in a 1.0M LiTFSI/AcN solution at room temperature. Samples are removed at intervals, e.g., 4 hours, 24 hours, 3 days, 5 days, and patted dry.

Example 2—Li Doped Polypropylene Glycol Based Polyurethane Film from Low Free Monomer PPG/TMDI Prepolymer and 3,3'-Dichloro-4,4'-Diaminodiphenylmethane (MOCA)

To 0.25 grams PPG/TMDI prepolymer ADIPRENE LFG 964A, was added a solution of 0.0375 grams of LiTFSI in 1 mL of PMAc. The mixture was stirred and heated by a 70 C oil bath for approximately 10 minutes to completely dissolve the prepolymer, after which 0.046 grams of 3,3'-dichloro-4,4'-diaminodiphenylmethane (MOCA) was added, the resulting mixture was stirred at 70 C for 5 minutes to dissolve MOCA, degassed under vacuum for 3 minutes and then poured onto a TEFLON coated silica wafer heated on a 100 C hotplate. The cast film on the silica wafer was dried on the hotplate for an additional 10 minutes to allow most of the remaining solvent to evaporate and then placed in an oven at 100 C to post cure for 16 hours to provide a 150-200 micron polyurethane film containing 15 wt % of lithium salt.

Example 2a

Following the procedure of Example 2, but using only 67% of the amount of LiTFSI, provided a 150-200 micron polyurethane film containing 10 wt % of lithium salt.

Example 2C—Polypropylene Glycol Based Polyurethane Film from Low Free Monomer PPG/TDI Prepolymer and MOCA Containing No LiTFSI Following the procedure of Example 2, but without adding any LiTFSI, provided a 150-200 micron polyurethane film containing no lithium salt.

Example 2SPC—LiTFSI Salts Imbibed into PPG/TDI Polyurethane Film, Propylene Carbonate (PC)

Samples of the film obtained in Ex 2C are soaked in a 1.0M LiTFSI/PC solution at room temperature. Samples are removed at intervals, e.g., 4 hours, 24 hours, 3 days, 5 days, and patted dry.

Example 2SAcN—LiTFSI Salts Imbibed into PPG/TDI Polyurethane Film, Acetonitrile (AcN)

Samples of the film obtained in Ex 2C are soaked in a 1.0M LiTFSI/AcN solution at room temperature. Samples are removed at intervals, e.g., 4 hours, 24 hours, 3 days, 5 days, and patted dry.

Performance Characteristics

Swelling Property:

Directly prepared Li+ doped films—Samples of films of Example 1 and 2 containing 15% LiTFSI were cut into an appropriate size and shape for use as separators and immersed in propylene carbonate (PC) containing 3% LiTFSI for 16 hrs. The test separators were then withdrawn from solvent contact and solvent adhering to the surface of the separator was removed by gentle pressing on a blotting paper. The weight and the dimensional length gain of each sample was measured, the thickness of the specimen was determined beforehand using a micrometer, and compared to the weight and dimensional characteristics of the pre-soaked films. Solvent uptake and percentage length gain are reported as the swelling ratio shown in Table 1.

Films imbibed with Li+ after casting—Samples of films prepared according to 10 were cut into an appropriate size and shape for use as separators and then soaked in a 1.0 M LiTFSI/PC solution at room temperature according to Ex 1 SPC for 4 hours, Ex 1 SPC/4 h, and 5 days, Ex 1 SPC/5 d. Weight gain and dimensional length gain reported in Table 1 reflect the difference between the non-soaked film cut from Ex 10 and the films Ex 1 SPC/4 h and EX 1 SPC/5 d.

Conductivity

The solvent soaked films were then placed between two stainless steel electrodes with a diameter of 1.27 cm using spring loading for good contact between electrode and film. The impedance of the sample was measured according to standard procedures over the frequency range of 0.1 Hz to 100 kHz with a 5 mV ac modulation using a Solartron-1260 gain-phase analyzer controlled by Z-plot software. The impedance spectrum plotted over the complex plane provides the bulk resistance (R) which is derived from the extrapolation of the real component value Z' at the imaginary component Z"=0. The sample conductivity (cr) is calculated using the equation: cr=URA, where L is the thickness of the membrane and A is the area of the electrode. The results summarized in Table 1.

TABLE 1

Comparative separator properties (room temperature)

| Film | Conductivity (S/cm) | PC uptake (%) | Length gain (%) |
|---|---|---|---|
| Ex 1 | $1.1 \times 10^{-5}$ | 57 | 9.5 |
| Ex 2 | $3.4 \times 10^{-4}$ | 187 | 40 |
| Ex 1SPC/4 h | $3.1 \times 10^{-5}$ | 43 | 5.0 |
| Ex 1SPC/5 d | $3.9 \times 10^{-5}$ | 49 | 7.4 |

Solvent uptake and conductivity measurements obtained following the same procedures for the films from Ex 1a and Ex 2a, 10 wt % lithium salt, gave results similar to those of Ex 1 and Ex 2 respectively.

Example 3—Preparation of a LiTFSI Containing PC/PPDI Prepolymer Composition without Solvent, and Li Doped Polymer Derived Therefrom The PC/PPDI prepolymer of Ex 1 was heated to 100 C, 41.4 gr. of which was mixed with 4.6 gr. of LiTFSI, and then heated in an oven at 100 C overnight in an attempt to dissolve the salt. A thick lumpy mixture of at least partially dissolved salt was formed.

After determining the isocyanate content of the prepolymer/LiTFSI composition, the prepolymer was heated to 100 C and mixed with butane diol as curative at 95% stoichiometry, and a catalyst using a preheated spatula in a quart tin can. The temperature of the curative when mixed is found in Table 2. The resulting mixture was then poured into a preheated button mold that was sprayed with silicon mold release prior to preheating and post cured for 18 hours at the mold temperature. The buttons were removed from the mold and tested for Shore Hardness. Reaction parameters and results are shown in Table 2.

Example 3C

The PC/PPDI prepolymer of Example 3 was cured, cast and molded following the procedure of Example 3 except that no LiTFSI was added.

Example 4—Preparation of a LiTFSI Containing PPG/TDI Prepolymer Composition without Solvent, and Li Doped Polymer Derived Therefrom The PPG/TDI prepolymer of Ex 2 was heated to 70 C, 45 gr. of which was mixed with 5 gr. of LiTFSI, and then heated in an oven at 70 C overnight in an attempt to dissolve the salt. A thick lumpy mixture of at least partially dissolved salt was formed.

After determining the isocyanate content of the prepolymer/LiTFSI composition, the prepolymer was heated to 100 C and mixed with MOCA as curative at 95% stoichiometry, and a catalyst using a preheated spatula in a quart tin can. The temperature of the curative when mixed is found in Table 2. The resulting mixture was then poured into a preheated button mold as above and post cured for 18 hours at the mold temperature. The buttons were removed from the mold and tested for Shore Hardness. Reaction parameters and results are shown in Table 2.

Example 4C

The PC/PPDI prepolymer of Example 4 was cured, cast and molded following the procedure of Example 4 except that no LiTFSI was added.

TABLE 2

| Prepolymer | % NCO | Curative | Curative Temp | Mold Temp | Shore Hardness |
|---|---|---|---|---|---|
| Ex 3 | 2.59 | BD | RT | 127 C. | — |
| Ex 3C | 3.71 | BD | RT | 127 C. | 94A |
| Ex 4 | 4.55 | MOCA | 120 C. | 100 C. | 64 D |
| Ex 4C | 6.07 | MOCA | 120 C. | 100 C. | 56 D |

Overall it seemed that the doped prepolymers cured slightly faster. There was no issue with the LFG964A due to its low viscosity but the LFP 3940A gave problems in its use.

Example 5—Preparation of a Li Salt Containing Prepolymer Composition without Solvent Via Continuous Mixing More consistent processing of lithium ion doped prepolymer is observed using a more controlled mixing process as follows. To a three neck flask equipped with nitrogen inlet is added 25 gr. lithium salt, e.g., LiTFSI, and 225 gr prepolymer, e.g., PPDI/polycarbonate prepolymer above. The mixture is heated to 70 C under nitrogen while applying continuous agitation until all the salt has dissolved. The resulting prepolymer mixture can then be handled, cured, cast and molded in a manner similar to that of undoped prepolymer.

Example 6—Li Doped Poly Tetramethylene Glycol Based Polyurethane Film from Low Free Monomer PTMG/TMDI Prepolymer and MOCA Following a procedure analogous to that of Ex 2, a TDI/poly-tetramethylene glycol prepolymer, ADIPENE LF 950A from Chemtura Corp., was mixed with LiTFSI, propylene glycol monomethane ether acetate (PMAc), and MOCA and cured to prepare a 150-200 micron thick polyurethane film containing 15 wt % of lithium salt.

Example 7—Poly Tetramethylene Glycol Based Polyurethane Film from Low Free Monomer PTMG/TMDI Prepolymer without Li Salt and MOCA Following a procedure similar to that of Ex 6 but omitting LiTFSI, the TDI/poly-tetramethylene glycol prepolymer was mixed with PMAc and MOCA and cured to prepare a 150-200 micron polyurethane film containing no lithium salt.

Example 8-17

Polyurethane Films from Prepolymer Blends and MOCA

Following the procedure of Ex 6 or Ex 7, a series of PUR films, 150 to 200 microns thick, were prepared from MOCA curing the following blends of the TDI/PTMG prepolymer of Ex. 6 and the TDI/PPG glycol of Ex 2:

| EXAMPLE | WT Ratio TDI/PTMG:TDI/PPG | LiTFSI |
|---|---|---|
| 8 | 75:25 | 15% |
| 9 | 60:40 | 15% |
| 10 | 50:50 | 15% |
| 11 | 40:60 | 15% |
| 12 | 25:75 | 15% |
| 13 | 75:25 | 0% |
| 14 | 60:40 | 0% |
| 15 | 50:50 | 0% |
| 16 | 40:60 | 0% |
| 17 | 25:75 | 0% |

Example 18—Polyurethane Film from an Ethylene Oxide Capped PPG/TMDI Prepolymer without Li Salt and MOCA Following the procedure of Ex 7 a prepolymer prepared from TDI and an ethylene oxide end capped poly-propylene glycol polyol, ADIPENE LFG 963A from Chemtura Corp., was mixed with PMAc and MOCA and cured to prepare a 150-200 micron thick polyurethane film containing no lithium salt.

Example 19—Polyurethane Film from a Blend Comprising PTMG/TMDI Prepolymer and an Ethylene Oxide Capped PPG/TMDI Prepolymer Following the procedure of Ex 18, a 50/50 blend of the prepolymer of Ex18 and the TDI/PTMG prepolymer of Ex. 6 was mixed with PMAc and MOCA and cured to prepare a 150-200 micron thick polyurethane film containing no lithium salt.

Example 20-24 and 20C-24C

Following the procedures of Example 1 and 10 but substituting one of the following amino curatives for butane diol, methylene dianiline, methylene bis chloroaniline, ethylene bis orthochloroaniline, 4,4'-methylene-bis(3-chloro-2,6-diethyl)aniline or dimethylthio-2,4-toluenediamine, generates additional polyurethane films from which separators are formed as described herein.

Test separators of the above films were prepared and tested for swelling and conductive characteristics as above. Directly prepared Li+ doped films containing 15% LiTFSI were cut into an appropriate size and shape for use as separators and immersed in propylene carbonate (PC) or acetonitrile (AcN) solutions containing 3% LiTFSI for 16 hrs before being withdrawn, pressed on a blotting paper to remove solvent, measured for weight gain and length gain, and tested for conductivity.

Films prepared without direct incorporation of Lithium salt were cut into an appropriate size and shape for use as separators and then soaked in a 1.0 M LiTFSI/PC or AcN solution at room temperature the time period shown in the table below. Weight gain and length gain reported in the following table reflect the difference between the cut, non-soaked film and the film after soaking for the time indicated. Conductivity The solvent soaked films were then placed between two stainless steel electrodes with a diameter of 1.27 cm using spring loading for good contact between electrode and film. The impedance of the sample was measured according to standard procedures over the frequency range of 0.1 Hz to 100 kHz with a 5 mV ac modulation using a Solartron-1260 gain-phase analyzer controlled by Z-plot software. The impedance spectrum plotted over the complex plane provides the bulk resistance (R) which is derived from the extrapolation of the real component value Z' at the imaginary component Z"=0. The sample conductivity (cr) is calculated using the equation: cr=L/RA, where L is the thickness of the membrane and A is the area of the electrode. The results summarized in Table 3

TABLE 3

| Film | LiTFSI wt. % | solvent | Conductivity (S/cm) | Weight gain (%) | Length gain (%) |
|---|---|---|---|---|---|
| Ex 1 | 15 | PC | $1.1 \times 10^{-5}$ | 57 | 9.5 |
| Ex 1SPC/4 hrs | 0 | PC | $3.1 \times 10^{-5}$ | 43 | 5.0 |
| Ex1SPC/5 days | 0 | PC | $3.9 \times 10^{-5}$ | 49 | 7.4 |
| Ex1 SAcN/24 hrs | 0 | AcN | $1.2 \times 10^{-4}$ | 30 | 3.8 |
| Ex 7/4 hrs | 0 | AcN | $1.7 \times 10^{-5}$ | 19 | 2.5 |
| Ex 7/3 days | 0 | AcN | $1.8 \times 10^{-5}$ | 19 | 2.8 |
| Ex 6 | 15 | PC | $4.3 \times 10^{-6}$ | 20 | 5.0 |
| Ex 8 | 15 | PC | $1.3 \times 10^{-5}$ | 39 | 7.5 |
| Ex 9 | 15 | PC | $3.5 \times 10^{-5}$ | 48 | 17 |
| Ex 10 | 15 | PC | $5.7 \times 10^{-5}$ | 61 | 14 |
| Ex 14/4 hrs | 0 | PC | $6.5 \times 10^{-7}$ | 25 | 5.6 |
| Ex 14/5 days | 0 | PC | $1.9 \times 10^{-4}$ | 112 | 25 |
| Ex 11 | 15 | PC | $1.2 \times 10^{-4}$ | 80 | 23 |
| Ex 12 | 15 | PC | $2.9 \times 10^{-4}$ | 140 | 36 |
| Ex 2 | 15 | PC | $3.4 \times 10^{-4}$ | 187 | 40 |
| EX 18/5 days | 0 | AcN | $1.3 \times 10^{-3}$ | 138 | 19 |
| Ex 18/5 days | 0 | PC | $6.6 \times 10^{-4}$ | 221 | 43 |
| Ex 19/5 days | 0 | AcN | $2.8 \times 10^{-4}$ | 64 | 15 |
| Ex 19/5 days | 0 | PC | $1.7 \times 10^{-4}$ | 84 | 15 |

Differences are seen in both swelling and conductivity depending on the solvents used, the manner of salt incorporation and the composition of the polymer film.

The above examples illustrate particular embodiments of the invention, but many others will be obvious to one skilled in the art in light of the present disclosure.

What is claimed:

1. An energy storage device comprising a non-porous, ion permeable separator disposed between an anode region and a cathode region, wherein the separator comprises an ion permeable film formed from a polycarbonate based polyurethane polymer, which polycarbonate based polyurethane polymer is prepared by crosslinking an isocyanate terminated pre-polymer having a polycarbonate backbone with a curing agent comprising a $C_{2-12}$ diol, methylene dianiline, methylene bis chloroaniline, ethylene bis orthochloroaniline, 4,4'-methylene-bis(3-chloro-2,6-diethyl)aniline, dimethylthio-2,4-toluenediamine, di-p-aminobenzoate, phenyldiethanol amine mixture, or a methylene dianiline sodium chloride complex,
   wherein the anode region comprising an anode chamber, a current collector, which current collector resides within the anode chamber and an anolyte; and
   the cathode region comprising a cathode chamber, a current collector, which current collector resides within the cathode chamber, and a catholyte.

2. The energy storage device according to claim 1, wherein the separator comprises the film formed from a polycarbonate based polyurethane polymer and a metal salt or ammonium salt.

3. The energy storage device according to claim 2 wherein the metal salt is a sodium or lithium salt.

4. The energy storage device according to claim 3 wherein the separator comprises at least one organic solvent selected from the group consisting of cyclic carbonate esters, acyclic dialkyl carbonate esters, butyrolactones, acetals, ethers, polyglymes, sulfoxides, sulfalones, amides and nitriles.

5. The energy storage device according to claim 2 wherein the separator comprises at least one organic solvent selected from the group consisting of cyclic carbonate esters, acyclic dialkyl carbonate esters, butyrolactones, acetals, ethers, polyglymes, sulfoxides, sulfalones, amides and nitriles.

6. The energy storage device according to claim 1 wherein the separator comprises at least one organic solvent selected from the group consisting of cyclic carbonate esters, acyclic dialkyl carbonate esters, butyrolactones, acetals, ethers, polyglymes, sulfoxides, sulfalones, amides and nitriles.

7. The energy storage device according to claim 6 wherein the at least one organic solvent is selected from the group consisting of cyclic carbonate esters, acyclic dialkyl carbonate esters, amides and nitriles.

8. The energy storage device according to claim 1 further comprising a vessel for storing anolyte or catholyte and/or a vessel for receiving spent anolyte or catholyte.

9. The energy storage device according to claim 8 which is a redox flow cell comprising a flowable anolyte and a flowable catholyte.

10. The flow cell of claim 9 wherein each of the flowable anolyte and flowable catholyte comprise an ion storage material comprising both redox active materials and working ions.

11. The flow cell of claim 9 which is a non-aqueous, organic flow cell.

12. The energy storage device according to claim 1, wherein the separator comprises the film formed from a polycarbonate based polyurethane polymer and at least one organic solvent selected from the group consisting of cyclic carbonate esters, acyclic dialkyl carbonate esters, amides and nitriles.

* * * * *